United States Patent
Becker et al.

(10) Patent No.: US 7,530,379 B1
(45) Date of Patent: May 12, 2009

(54) TIRE INFLATION SYSTEM

(76) Inventors: John Henry Becker, 322 Northpoint Pkwy., Suite J, Acworth, GA (US) 30102; John Charles Becker, 4110 Huntcliff Rd., Woodstock, GA (US) 30189

( * ) Notice: Subject to any disclaimer, the term of this patent is extended or adjusted under 35 U.S.C. 154(b) by 0 days.

(21) Appl. No.: 10/408,815

(22) Filed: Apr. 7, 2003

Related U.S. Application Data

(60) Provisional application No. 60/371,305, filed on Apr. 10, 2002.

(51) Int. Cl.
*B60C 23/00* (2006.01)
(52) U.S. Cl. ........................ 152/415; 152/416
(58) Field of Classification Search ............... 152/415, 152/416, 417, 418, 419; 73/146.5, 708; 340/442, 444
See application file for complete search history.

(56) References Cited

U.S. PATENT DOCUMENTS

| | | | | |
|---|---|---|---|---|
| 1,801,716 A | * | 4/1931 | Bowers | 152/417 |
| 2,634,781 A | * | 4/1953 | Turek | 152/417 |
| 2,657,731 A | * | 11/1953 | Gozzoli | 152/417 |
| 2,685,906 A | * | 8/1954 | Williams | 152/417 |
| 2,780,267 A | * | 2/1957 | Richards et al. | 152/417 |
| 2,849,047 A | * | 8/1958 | Lamont et al. | 152/417 |
| 2,931,414 A | * | 4/1960 | Jankowski | 152/417 |
| 3,037,544 A | * | 6/1962 | Gouirand | 152/415 |
| 3,276,503 A | * | 10/1966 | Kilmarx | 152/417 |
| 3,451,460 A | * | 6/1969 | Sipin | 152/417 |
| 3,578,014 A | * | 5/1971 | Gachot | 137/115.15 |
| 3,697,944 A | * | 10/1972 | Murano | 340/447 |
| 4,387,931 A | * | 6/1983 | Bland | 303/1 |
| 4,441,539 A | * | 4/1984 | Hulse | 152/417 |
| 4,598,750 A | * | 7/1986 | Gant | 152/416 |
| 4,678,017 A | * | 7/1987 | Schultz | 152/416 |
| 4,685,501 A | * | 8/1987 | Williams | 152/417 |
| 4,700,763 A | * | 10/1987 | Williams | 152/417 |
| 4,754,792 A | * | 7/1988 | Braun et al. | 152/417 |
| 4,763,709 A | * | 8/1988 | Scholer | 152/416 |
| 4,893,664 A | * | 1/1990 | Oltean | 152/416 |
| 5,244,027 A | * | 9/1993 | Freigang | 152/416 |
| 5,287,906 A | * | 2/1994 | Stech | 152/417 |
| 5,313,995 A | * | 5/1994 | Schultz | 152/416 |
| 5,327,346 A | * | 7/1994 | Goodell | 701/71 |
| 5,398,743 A | * | 3/1995 | Bartos | 152/416 |

(Continued)

FOREIGN PATENT DOCUMENTS

| | | | |
|---|---|---|---|
| WO | WO 90/02662 | * | 3/1990 |

*Primary Examiner*—Russell D Stormer
(74) *Attorney, Agent, or Firm*—Dennis W. Jones

(57) ABSTRACT

Land transportation vehicles using pneumatic tires loose air over time, including tractor trailers, private vehicles, race cars and other vehicle classifications. Tire pressure is important, but only a small number of attendants are concerned. Our invention is an automatic device which supplies air to tractor trailer tires using an onboard air supply. This air, supplied to the rotary air chamber system can be adjusted to a desired tire air pressure by the individual driver to suitable levels of load weights, climates, travel speed and terrain. Rotating tires at high speeds build up friction raising tire pressure to dangerous levels. This will be corrected by built in relief valves. To maintain and verify tire pressures each tire is protected by check valves and visible pressure gauges. The rotary air chamber automates, corrects continuously the neglect of proper tire maintenance, adds road safety for users and public alike.

12 Claims, 6 Drawing Sheets

U.S. PATENT DOCUMENTS

| | | | | |
|---|---|---|---|---|
| 5,399,072 A * | 3/1995 | Westphal | | 417/234 |
| 5,505,080 A * | 4/1996 | McGhee | | 73/146.5 |
| 5,538,062 A * | 7/1996 | Stech | | 152/417 |
| 5,540,268 A * | 7/1996 | Mittal | | 152/415 |
| 5,544,688 A * | 8/1996 | Freigang et al. | | 152/415 |
| 5,587,698 A * | 12/1996 | Genna | | 340/442 |
| 5,629,874 A * | 5/1997 | Mittal | | 702/140 |
| 5,807,445 A * | 9/1998 | Hoffmann | | 152/415 |
| 5,849,120 A * | 12/1998 | Drieux | | 152/416 |
| 6,011,463 A * | 1/2000 | Cormier, Sr. | | 340/447 |
| 6,098,682 A * | 8/2000 | Kis | | 152/415 |
| 6,374,869 B2 * | 4/2002 | Makino et al. | | 141/38 |
| 6,401,743 B1 * | 6/2002 | Naedler | | 137/224 |
| 6,425,427 B1 * | 7/2002 | Stech | | 152/417 |
| 6,550,511 B2 * | 4/2003 | Nienhaus | | 152/415 |
| 6,601,625 B2 * | 8/2003 | Rheinhardt | | 152/418 |
| 6,612,346 B1 * | 9/2003 | Allen et al. | | 141/38 |
| 7,302,980 B2 * | 12/2007 | Ingram | | 152/417 |

* cited by examiner

TIRE INFLATION SYSTEM

CROSS REFERENCE TO RELATED APPLICATION

This application claims priority of provisional Application No. 60/371,305 filed on Apr. 10, 2002.

BACKGROUND OF THE INVENTION

Over a million tractor trailers travel the nation's highways and incur heavy expenditures to maintain tire pressure at recommended pressure levels which operate generally between 100 and 110 psi. A recent publication indicates that 56% of all road cost is due to tire failures.

A typical long hauler will see a tire pressure loss up to 10 psi/week causing accelerated tire wear of 10% and increase fuel consumption up to 3.3% for under inflated tires.

It is estimated over 20 million tires are damaged annually by running over road hazards such as fallen bolts from other units, large pot holes, washboard interstates, rail tracks and the rubber compound itself will leak air over time.

The injection of air into tires of tractors while traveling high speeds is not available except by using a separate air compressor which is costly $(10,000) used primarily by the military and slow moving vehicles running over sand terrain and off road construction.

BRIEF SUMMARY OF THE INVENTION

The invention embodies a closed circuit air system used to control tire pressure on tractors, trailers, buses etc.

High pressure air is obtained from one or more air tanks already installed on a vehicle to service air brakes and other similar equipment. This air is piped into an air regulator box and travels through one or more independent air lines into a rotary air chamber fastened to the drive axles of tractors and trailers.

The air chamber rotates with the vehicle's wheels and conducts air into each tire at a preset pressure. When traveling at high speeds heat is generated and tire pressure increases. In hot summer climates it can increase to an explosive level. The chamber design allows the increased tire pressure to "bleed off" through safety valves.

Broadly the tire inflation system of the invention in one embodiment comprises an air chamber for monitoring the air pressure of a tire, the air chamber secured to the tire for rotation therewith. A source of pressurized air is introduced into the air chamber and air flows from the air chamber to the tire. Means are provided to release the air from the tire when the tire pressure exceeds a predetermined level. Means are provided to detect when the pressure falls below a predetermined level and optionally to increase the pressure of the air introduced into the air chamber.

In another embodiment of the invention a coolant, such as nitrogen is added to the pressurized air.

In still another embodiment means are provided to detect a catastrophic tire failure and stop the flow of air to the tire.

In still another embodiment the air chamber monitors the air pressure of at least two tires

DESCRIPTIONS OF THE PREFERRED EMBODIMENTS

Figure 1:
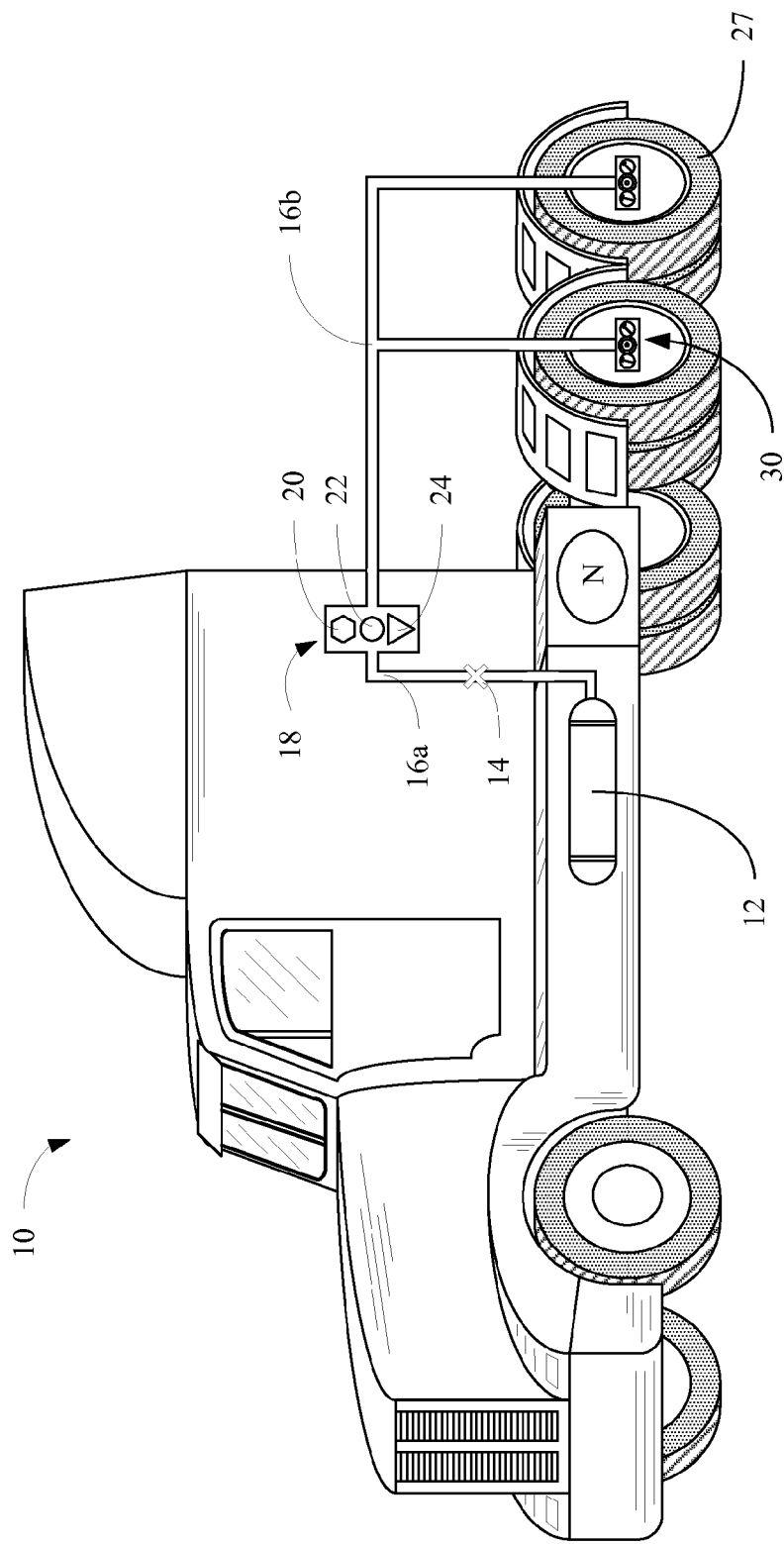
FIG. 1 is a schematic view of tire inflation system using a prior art tractor air tank as its air source.

Referring to FIG. 1; a tractor is shown as 10 representing a vehicle which has a prior art pressurized air tank 12 with output air pressure of 150 psi or less. The tank 12 is typically used for air brake systems and/or air bags. Also shown is a prior art nitrogen tank N. A typical tractor/trailer tire should be maintained at its design pressure e.g. 100 psi. A shut off valve 14 on an air line 16a controls the flow of air into an air pressure regulator box 18. Inside the box is a variable pressure regulator 20, a pressure gauge 22 and a water separator 24. An airline 16b functions as a manifold to distribute air to a rotary air chamber 30 associated with each tire 27. In FIG. 1 only the drivers side airlines are shown. These airlines are duplicated on the passenger side.

Figure 2:
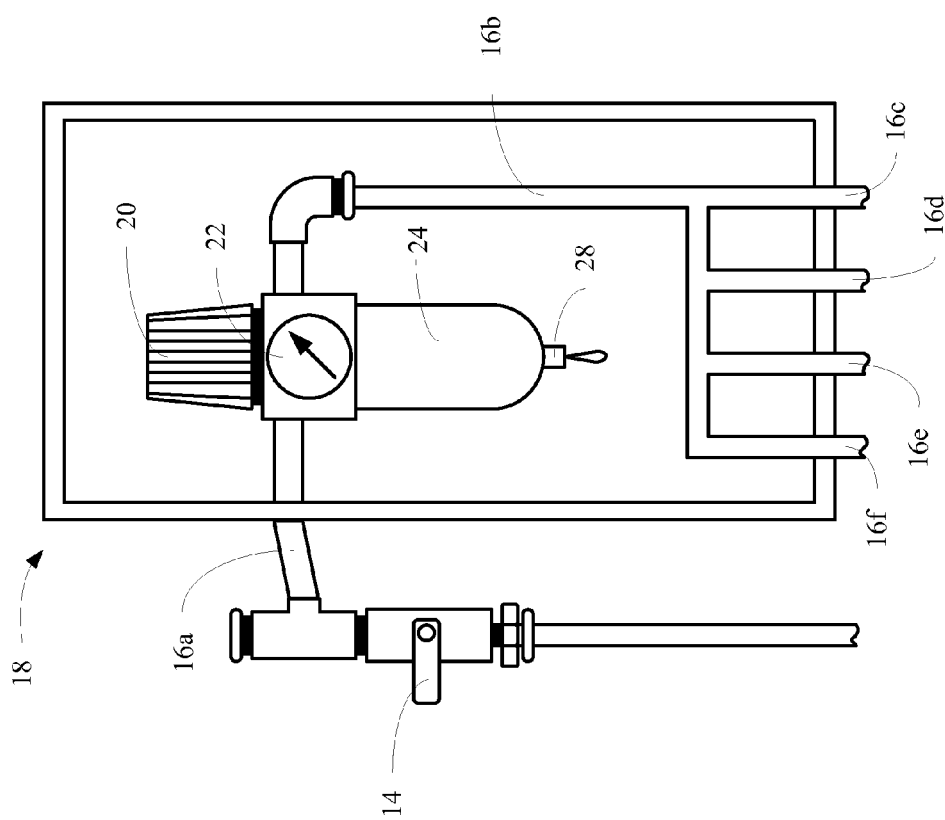
FIG. 2 is a schematic of an air control center using regulators and separate delivery lines.

Referring to FIG. 2 the regulator box 18 is shown in greater detail and comprises an adjustable air inlet regulator valve 20 with an outlet pressure gauge 22, e.g. 100 psi and a water filter 24 and an automatic drain 28. The outlet air line 16b is connected to manifold outlet(s) with one or more outlets 16c, 16d, 16e, 16f connected to one or more air chambers 30.

Figure 3:
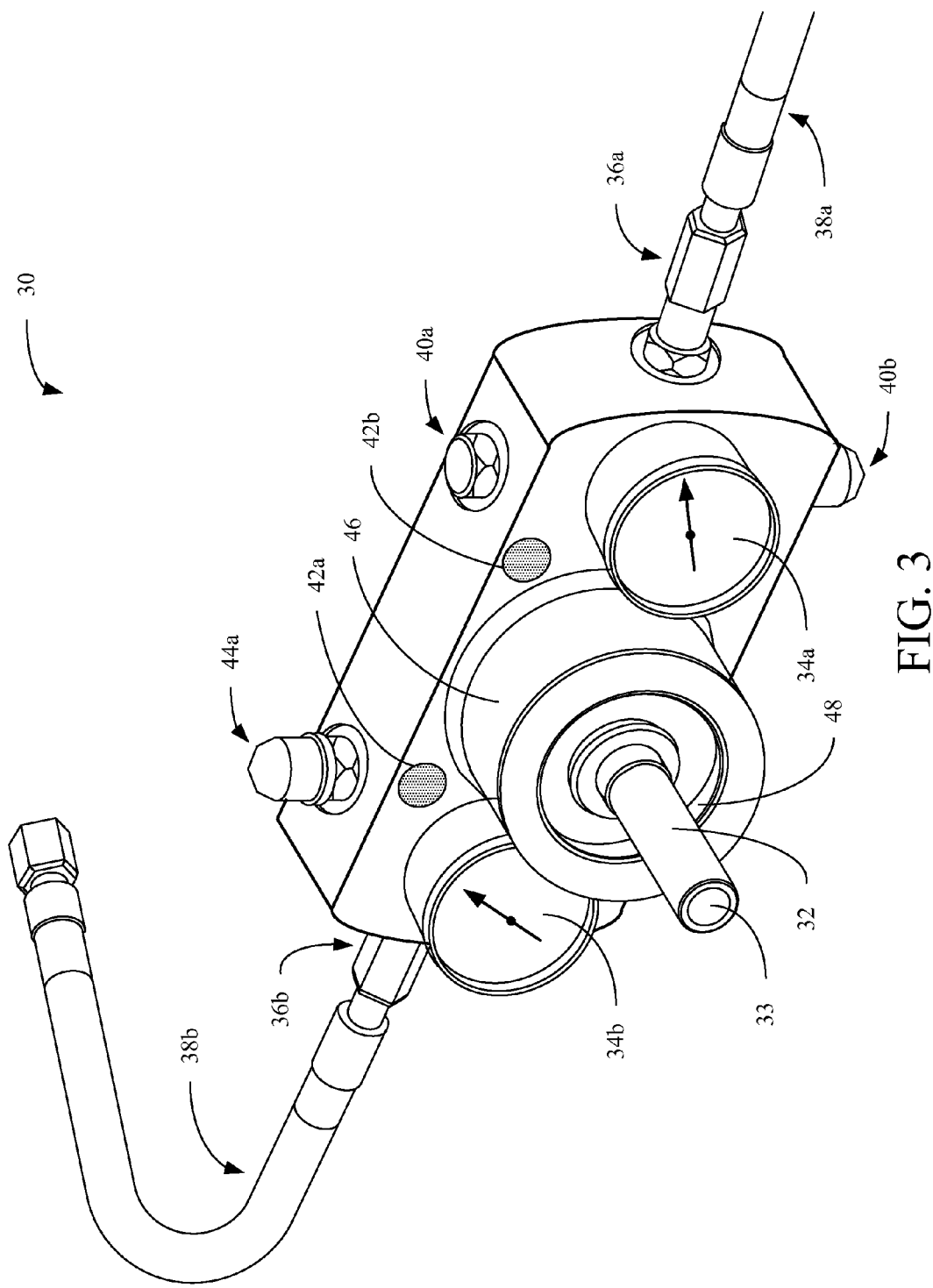
FIG. 3 is a perspective view of a rotary air chamber.

Referring to FIG. 3, the rotary air chamber 30 is shown in greater detail.

A stationary shaft 32 is secured air tight to one of the outlet airlines 16c, 16d, 16e,16f where the inlet air enters the stationary shaft at 33 in air chamber 30.

Pressure gauges 34a and 34b indicate the pressure for each associated tire 27 (not shown). Excess flow-check valves 36a and 36b are positioned between the chamber 30 and air hoses 38a and 38b are connected to tires 27 (not shown)

Relief valves 40a and 40b (40b not shown) are connected to 41a and 41b (FIG. 4) to relieve high tire pressure such as experienced in hot weather. The chamber 30 has connection holes 42a and 42b for bracket attachment 43 (not shown) to each tractor axle.

Air fill valves 44a and 44b (not shown), for initial and manual filling the tires 27 with air are secured outside the chamber 30 e,g, for road call service. The shaft 32 and inlet 33 pass air into and through a bearing housing 46 and seal closure 48 as shown in FIG. 4

Figure 4:
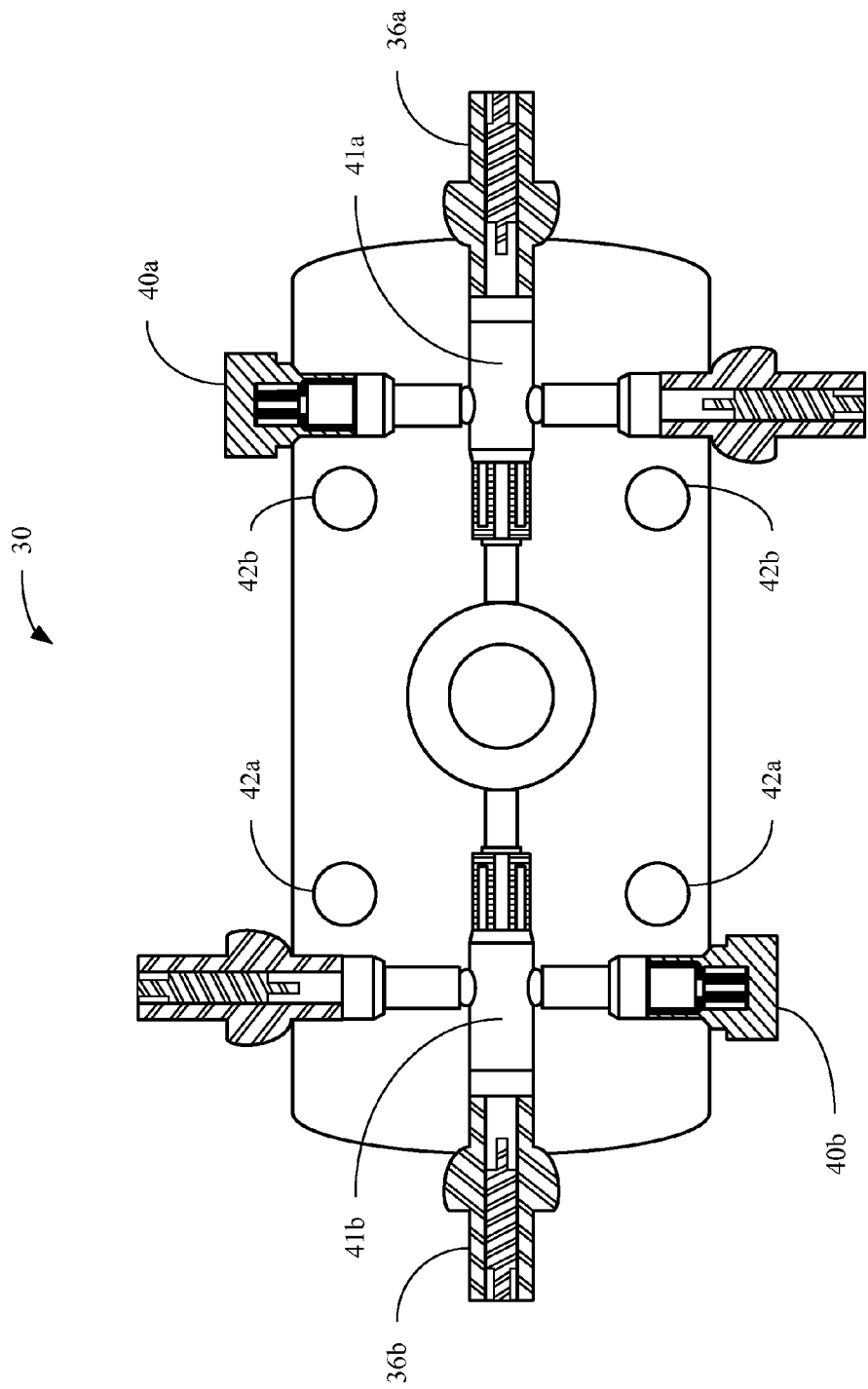
FIG. 4 is a sectional view of FIG. 3 taken along lines 4-4.
Figure 5:
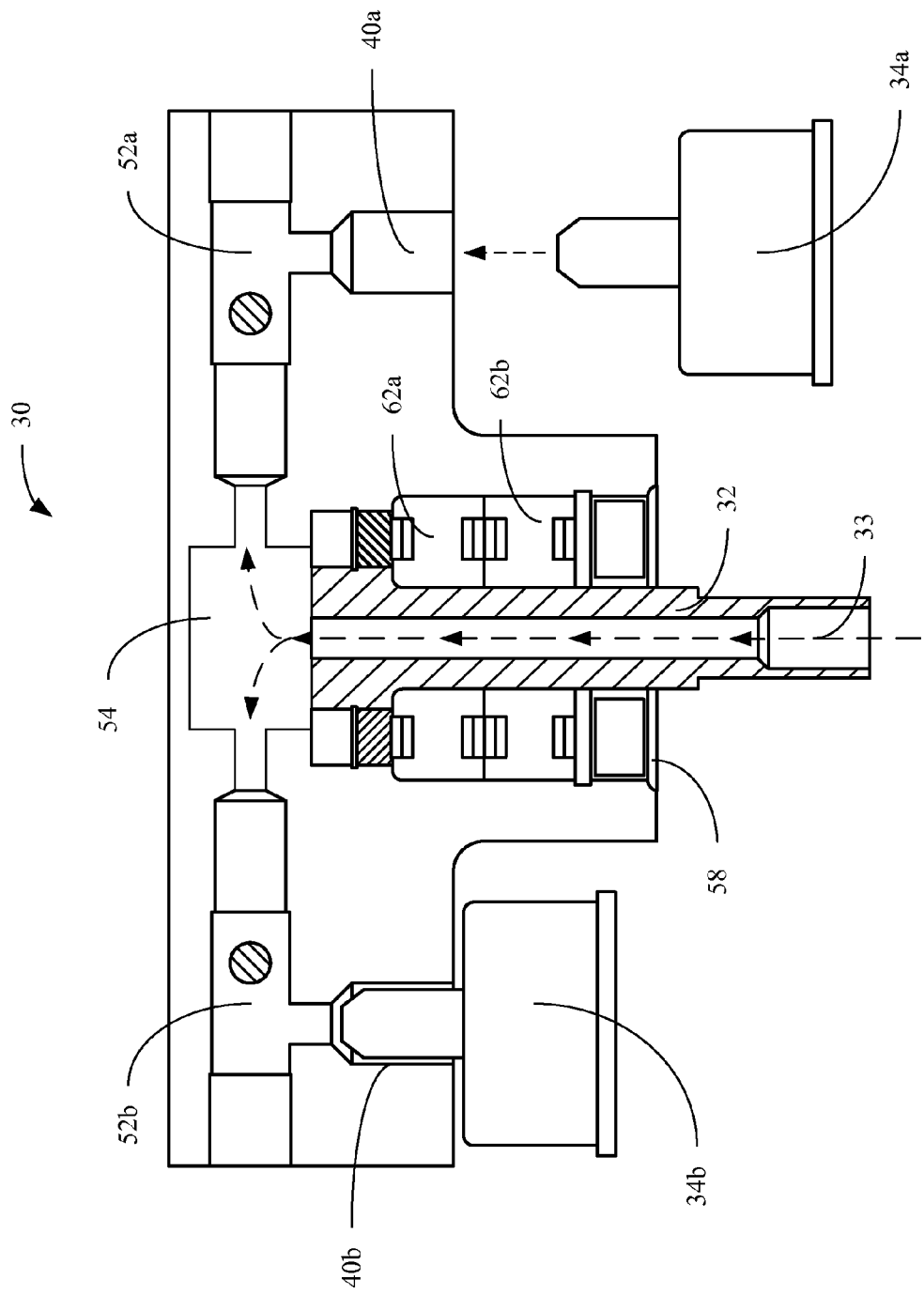
FIG. 5 is a sectional view of FIG. 3 taken along lines 5-5.

Referring to FIGS. 4 and 5 the air chamber 30 is shown in greater detail.

Figure 6:
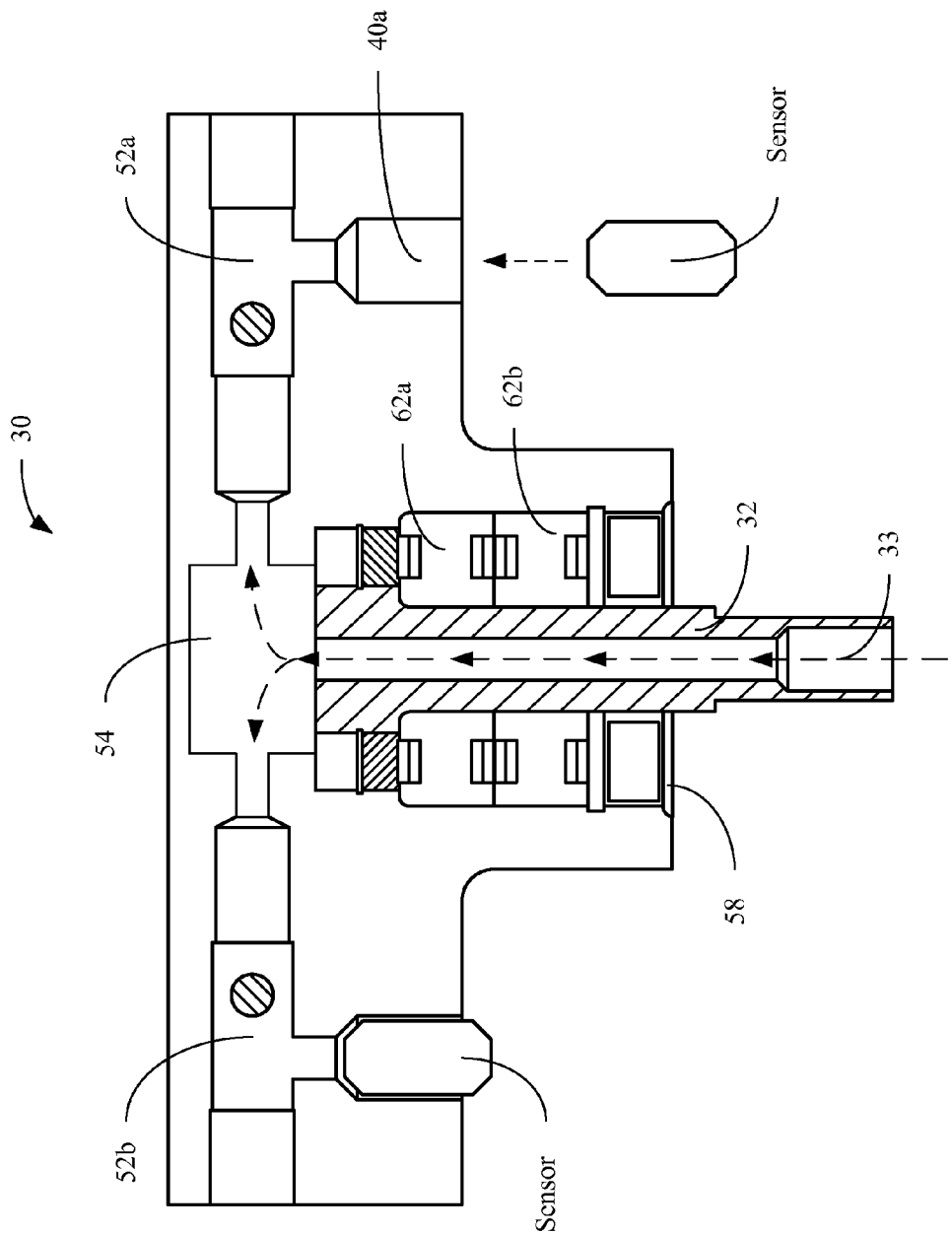
FIG. 6 is a sectional view of FIG. 5 taken along lines 6-6.

Referring to FIG. 6 the check valves 36a and 36b and air hoses 38a and 38b communicate with a longitudinal chamber or zone 50. The zone 50 has two mirror sides 52a and 52b which are in air flow pressure communication with the gauges 34a and 34b (FIG. 3). Relief valves 40a and 40b and air fill valves 44a and 44b. Intermediate the sides 52a and 52b is a mixing chamber 54 which communicates with the air intake 32 (FIG. 3) commun Shown in greater detail is the seal closures in 48.

There is an outer seal 58, a seal retainer ring 60, precision rotating ball bearings 62a and 62b, a pressure seal 64 and the air mixing chamber 54. The shaft 32 is fixed. The chamber 30 is attached to a bracket 43 and bolted by four bolts to the axle hub (not shown) of the tire 27. The air hoses 38a and 38b are secured to the side-by-side tires 27. The chamber 30 and hoses 38a and 38b rotate with the tires 27.

In the operation of the invention, described for only one pair of tires 27, to operate at 100 psi the following settings are made. The upstream pressure control gauge 20 (FIG. 2) is set at 100 psi. and pressure gauge 34a, 34 b measures the actual tire pressure.

If excess pressure is detected by the pop-off relief valve 40a or 40b e.g. 115 psi, the relief valves will open until the pressure returns to 100 psi and then close. If desired an adjustable pressure relief valve can be used.

Being mounted on the outside of the tire, pressure gauge 34a and 34b are manually read. If the driver desires a different pressure rating, the valve 20 is changed to increase/decrease pressures.

If hot driving conditions are expected, nitrogen from an auxiliary tank N may be bled into the line 16a. which flows to the adiabatic mixing chamber 54. This can be effected by a fixed bleed. This technique, per se, is known in the art.

The air flow system operates on a positive pressure if small leaks occur (e.g. bolt in tire) the system will increase flow rate to always maintain the pre-established tire pressures.

Driver can alter tire pressure depending on load requirements (e.g. ready mix cement haulers)

However catastrophic failure of one tire would affect the other tire. Therefore the excess flow check valve closes to prevent this. This occurs when the check valve 34a and 34b senses an increased flow rate e.g. 7-10 cfm.

Many of the functions described in the above specific example were manual, the adjustment of the valve 20, the manual reading of the gauges 34 and the nitrogen bleed. It is within the scope of the invention that these functions can be automated. (i) a temperature and/or pressure sensor to control the flow of the nitrogen (ii) the pressure gauges sending pressure readings to the dashboard displays of pressure (iii) dashboard or automatic control of the valve 20 in response to the pressure readings.

Having described the above invention we hereby attach our claims as:

1. A tire inflation system in which tire pressure is continuously maintained during use for multiple tires, the system comprising:
    an air chamber secured to a hub of a wheel, the air chamber being operable to rotate with the wheel, the air chamber having a plurality of air paths, each air path configured to provide air to a corresponding tire;
    a shaft configured to remain stationary when the air chamber rotates with the wheel, the shaft having a proximal end and distal end, the proximal end of the shaft extending into the air chamber, the distal end of the shaft being operable to receive the air;
    an inlet valve configured to provide a continuous flow of air through the shaft into the air chamber, the inlet valve coupled to an air source that provides the air at a pressure above a predetermined maximum tire pressure;
    a plurality of pressure relief valves, each pressure relief valve disposed on a respective air path of the air chamber, each respective pressure relief valve configured to release air from the corresponding tire when tire pressure rises above an adjustable preset maximum value, the respective pressure relief valve having no effect on tires corresponding to other air paths;
    a plurality of check valves, each check valve disposed on a respective air path of the air chamber, each respective check valve configured to inject air into the corresponding tire when tire pressure drops below an adjustable preset minimum value, the respective check valve having no effect on tires corresponding to other air paths; and
    a plurality of pressure gauges, each pressure gauge disposed on a respective air path of the air chamber to provide air pressure for the corresponding tire,
    wherein each tire pressure is maintained within a range specified by the adjustable preset minimum value and the adjustable preset maximum value.

2. The system of claim 1, further comprising ball bearings configured to separate the shaft from the air chamber.

3. The system of claim 1, wherein the check valve is further configured to close off air flow upon detecting an increase in air flow rate above a predetermined level.

4. The system of claim 1, wherein the pressure gauge further comprises a sensor capable of transmitting a signal indicating measured air pressure to a monitoring system.

5. The system of claim 1, further comprising a stationary air source configured to inject air through the inlet valve.

6. The system of claim 5, further comprising an air line configured between the stationary air source and the inlet valve.

7. The system of claim 5, further comprising at least one shut-off valve configured between the stationary air source and the inlet valve.

8. The system of claim 5, further comprising an air pressure regulator configured between the stationary air source and the inlet valve.

9. A tire device to continuously maintain tire pressure during use for multiple tires, the tire device comprising:
    an air chamber secured to a hub of a wheel, the air chamber being operable to rotate with the wheel, the air chamber having a plurality of air paths, each air path configured to provide air to a corresponding tire, the air chamber comprising,
        a plurality of pressure relief valves, each pressure relief valve disposed on a respective air path of the air chamber, each pressure relief valve configured to release air from the corresponding tire when tire pressure rises above an adjustable preset maximum value, the respective pressure relief valve having no effect on tires corresponding to other air paths;
        a plurality of check valves, each check valve disposed on a respective air path of the air chamber, each respective check valve configured to inject air into a tire when the tire pressure drops below an adjustable preset minimum value, the respective check valve having no effect on tires corresponding to other air paths; and
        a plurality of pressure gauges, each pressure gauge disposed on a respective air path of the air chamber to indicate air pressure for the corresponding tire; and
    a shaft configured to remain stationary when the air chamber rotates with the wheel, the shaft having a proximal end and distal end, the proximal end of the shaft extending into the air chamber, the distal end of the shaft being operable to receive the air,
    wherein each tire pressure is maintained within a range specified by the adjustable preset minimum value and the adjustable preset maximum value.

10. The tire device of claim 9, further comprising ball bearings configured to separate the shaft from the air chamber.

11. The tire device of claim 9, wherein the check valve is further configured to close off air flow upon detecting an increase in air flow rate above a predetermined level.

12. The tire device of claim 9, wherein the pressure gauge further comprises a sensor capable of transmitting a signal indicating measured air pressure to a monitoring system.

* * * * *